(12) United States Patent  
Iwashita et al.

(10) Patent No.: US 7,757,526 B2
(45) Date of Patent: Jul. 20, 2010

(54) METHOD FOR CHANGING FORCE CONTROL GAIN AND DIE CUSHION CONTROL APPARATUS

(75) Inventors: Yasusuke Iwashita, Fujiyoshida (JP);
Tadashi Okita, Fujiyoshida (JP);
Hiroyuki Kawamura, Yamanashi (JP);
Satoshi Ikai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 330 days.

(21) Appl. No.: 11/857,620

(22) Filed: Sep. 19, 2007

(65) Prior Publication Data

US 2008/0066515 A1    Mar. 20, 2008

(30) Foreign Application Priority Data

Sep. 20, 2006    (JP) .............................. 2006-254692

(51) Int. Cl.
*B21C 51/00* (2006.01)
(52) U.S. Cl. .................... 72/21.4; 72/14.8; 72/20.2; 72/351; 72/453.13
(58) Field of Classification Search .................. 72/14.8, 72/16.3, 20.1, 20.2, 21.4, 21.5, 350, 351, 72/453.13, 454, 466.9, 14.4, 20.3
See application file for complete search history.

(56) References Cited

U.S. PATENT DOCUMENTS

| 3,740,997 | A | * | 6/1973 | Blake et al. ................. 72/466.7 |
| 5,056,038 | A |   | 10/1991 | Kuno et al. |
| 5,692,404 | A | * | 12/1997 | Kirii et al. .................... 72/15.1 |
| 5,735,201 | A | * | 4/1998 | Hirao et al. ............ 100/269.01 |
| 6,205,863 | B1 |  | 3/2001 | Ishii et al. |
| 7,401,488 | B2 | * | 7/2008 | Baba ............................ 72/351 |
| 7,506,530 | B2 | * | 3/2009 | Iwashita et al. ............... 72/454 |
| 2006/0090656 | A1 |  | 5/2006 | Iwashita et al. |
| 2006/0267535 | A1 | * | 11/2006 | Iwashita et al. ............. 318/619 |

FOREIGN PATENT DOCUMENTS

| DE | 3937733 | * | 5/1991 |
| EP | 0897110 A2 |   | 2/1999 |
| GB | 2235067 A |   | 2/1991 |
| JP | 10202327 A |   | 8/1998 |
| JP | 2006130524 A |   | 5/2005 |

OTHER PUBLICATIONS

EP Search Report for 07018419.7 dated Aug. 18, 2008.

* cited by examiner

*Primary Examiner*—Edward Tolan
(74) *Attorney, Agent, or Firm*—Lowe Hauptman Ham & Berner LLP

(57) ABSTRACT

A method for changing a force control gain expressed as a ratio of force error to velocity command value in a control circuit performing a force control of a servo motor driving a die cushion disposed opposite to a slide in a press machine. The method includes: obtaining a difference between a displacement of the slide and a displacement of the die cushion in a state in which the slide and the die cushion collide with and are exerting force on each other; detecting the force when the difference of the displacements is obtained; calculating a spring constant of a structural portion based on a proportionality between the difference of the displacements and the force, when regarding the structural portion including the slide and the die cushion as an elastic structure; and changing the force control gain based on the spring constant using a fixed proportionality that exists between the force control gain and a reciprocal of the spring constant.

6 Claims, 9 Drawing Sheets

METHOD FOR CHANGING FORCE CONTROL GAIN AND DIE CUSHION CONTROL APPARATUS

CROSS REFERENCE TO RELATED APPLICATION

The present application claims the benefit of priority based on Japanese Patent Application No. 2006-254692, filed on Sep. 20, 2006, the disclosure of which is incorporated herein in its entirety by reference.

BACKGROUND OF THE INVENTION

1. Field of the invention

The present invention relates to a method for changing a force control gain and a die cushion control apparatus for changing the force control gain expressed as a ratio of force error to a velocity command value in a control circuit which uses a servo motor to perform force control of a die cushion such that a force of a specified value may be produced by a slide in a press in the interaction with the die cushion disposed opposite to the slide.

2. Description of the Related Art

Generally, in a method for controlling a die cushion in force control using a servo motor such that a force of a specified value may be produced between a slide and a die cushion, a force error is multiplied by a force control gain to obtain a velocity command value, and the velocity command value obtained in this manner is used to control driving of the servo motor. The force error is the difference between a preset force command value and an actual detection value of the force produced between the slide and the die cushion.

The force control gain is determined prior to actual operation of a press machine, and during the operation of the press machine, the determined gain is used for force control of a servo motor to carry out the operation of the press machine. If the determined value of the force control gain is not appropriate, a control system may become unstable due to oscillations or excessive overshoots. If the force control gain is too great, the press machine or the accessories of the press machine may be broken or damaged. Therefore, a force control gain is usually determined as an upper limit of a range such that oscillations or overshoots may not exceed a specified value.

In an exemplary method for determining the force control gain, a constant force is applied in the direction of an axis of force control, and while the gain is incrementally increased, starting from a sufficiently low gain, a magnitude of overshoot is detected for each force command value until an upper limit of the force control gain is obtained. The force control gain obtained in this manner needs to be changed as required, since an optimal value changes because of the aging of press machines, change of material of work pieces, or individual variation of press machines.

Although not directly related to the present invention, an exemplary method in related art is disclosed in Japanese Patent Publication No. H10-202327. In this method, a die cushion is controlled by a torque command to a servo motor. Also, a method is disclosed in Japanese Patent Publication No. 2006-130524, in which a die cushion is controlled by velocity command to a servo motor such that a force control is performed with the velocity command corrected in accordance with the detected velocity of a slide.

However, there is a problem with a force control gain that may be affected by the operational environment (such as inertia, mass, rigidity), and high skill is necessary in order to obtain an accurate value. There is also another problem that, if the force control gain is adjusted incrementally, starting from a low initial value of force control gain within a range that does not exceed the upper limit of a specified overshoot, the number of repeated trials become too excessive and a gain adjustment takes too much time.

SUMMARY OF THE INVENTION

It is an object of the present invention to provide a method for changing a force control gain and a die cushion control apparatus that permits changing of the force control gain to be performed easily and accurately in accordance with the characteristics of a press machine and the conditions for press operation.

In order to attain the above object, in accordance with an aspect of the present invention, there is provided a method of changing force control gain expressed as a ratio of force error to a velocity command value in a control circuit performing a force control a servo motor driving a die cushion disposed in opposition to a slide in a press machine, the method comprising: obtaining a difference between displacements of the slide and the die cushion as they are exerting force to each other at a time of collision of the slide and the die cushion, detecting a force when the difference of the displacements is obtained, and when a structural portion including the slide and the die cushion is considered as an elastic structure, calculating a spring constant of the structural portion based on a proportionality between the difference of the displacements and the actual force, and using a proportionality between the force control gain and a reciprocal of the spring constant to change the force control gain based on the spring constant.

In accordance with an aspect of the present invention, there is provided a die cushion control apparatus for performing force control of a die cushion that is disposed in opposition to a slide in a press using a servo motor, the apparatus comprising: a displacement obtaining section which obtains a difference between displacements of the slide and the die cushion as they are exerting force on each other at a time of collision of the slide and the die cushion, a spring constant calculating section which, when a structural portion including the slide and the die cushion is considered as an elastic structure, calculates a spring constant of the structural portion based on a proportionality between the difference of the displacements and a actual force, and a force control gain changing section which uses a proportionality between the force control gain and a reciprocal of the spring constant to change the force control gain based on the spring constant.

With this invention, since there is a proportionality, when the structural portion including the slide and the die cushion is considered an elastic structure, between the difference of displacements of the slide and the die cushion and the actual force detected between the slide and the die cushion when this difference of displacements is produced, then a spring constant of a structural portion including the slide and the die cushion can be calculated by dividing the actual force detected between the slide and the die cushion by the difference of displacements of the slide and the die cushion. Since there is an inverse proportionality between the calculated spring constant and the force control gain in the force control circuit, the proportionality constant can be multiplied by the reciprocal of the spring constant to obtain the force control gain.

In this way, a force control gain can be changed easily and accurately in accordance with variation of characteristics of press machines and changes in the conditions of press operation, so that responsiveness of the force control and a reliability of the force control can be improved. Since an optimal force control gain can be used, more precise pressing of a three dimensional shape can be achieved.

BRIEF DESCRIPTION OF THE DRAWINGS

The above and other objects, features and advantages of the present invention will become more apparent from the following description of the preferred embodiments with reference to appended drawings, in which.

DETAILED DESCRIPTION

Figure 1:
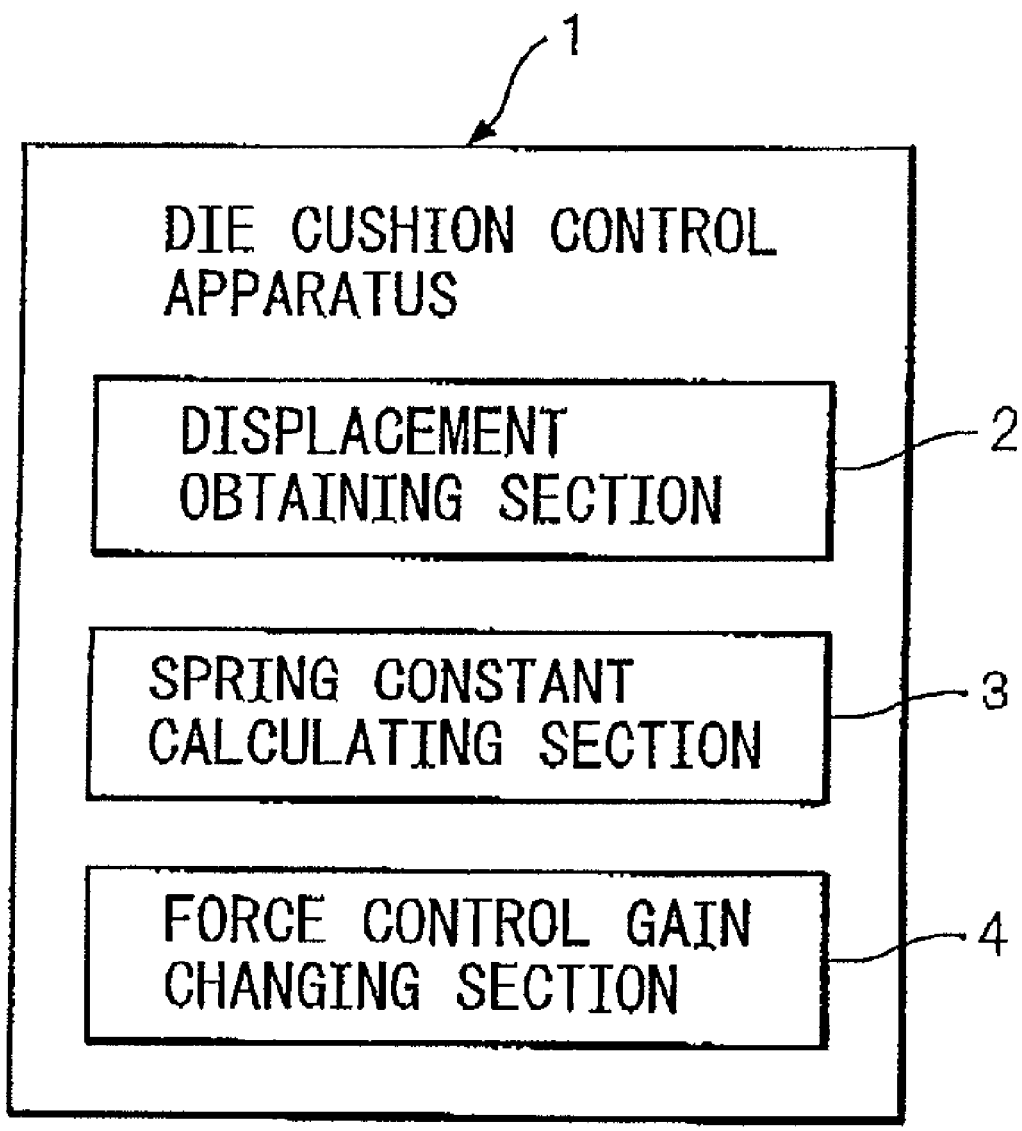
FIG. 1 is a view of the construction of a die cushion control apparatus according to an embodiment of the present invention.

The embodiments of the present invention will now be described in detail below with reference to drawings showing specific examples thereof. In FIG. 1, a die cushion control apparatus according to an embodiment of the present invention is shown. The die cushion control apparatus of this embodiment is a die cushion control apparatus 1 which uses a servo motor 14 to perform force control of a die cushion 13 that is operated opposite to a slide 12 of a press machine 11 shown in FIG. 3 (shown only in part) and cooperates with slide 12 to exert a specified force to a pressed work piece 19. Slide 12 is situated on the upper side of press machine 11 and is adapted to be moved up and down by an oil hydraulic cylinder (not shown) as a driving source. Die cushion 13 is situated on the lower side of press machine 11 and is adapted to be moved up and down by a servo motor 14 via a ball screw 15. When slide 12 and die cushion 13 collide via pressed work piece 19, a force is exerted between them. With a downward relative movement of die cushion 13 relative to slide 12, the force acting between them is adjusted so as to increase the plastic flow of pressed work piece 19.

Die cushion control apparatus 1 according to the present embodiment has the function of changing the force control gain expressed as the ratio of the force error to the velocity command value to an optimal value in accordance with the variation of machine characteristics of press machine 11 or change of conditions for press operation in the control circuit for controlling the force between slide 12 and die cushion 13, and comprises, as shown in FIG. 1, a displacement obtaining section 2 which obtains the difference between the displacements of slide 12 and die cushion 13 as they are exerting force on each other at the time of collision (see FIG. 4), a spring constant calculating section 3 which, by regarding a press functional structure portion (structural portion) 16 including slide 12 and die cushion 13 as an elastic structure, calculates a spring constant of press functional structure portion 16 based on a certain proportionality which exists between the difference of displacements and the force, and a force control gain changing section 4 which uses a proportionality that exists between the force control gain and the reciprocal of the spring constant to change the force control gain in correspondence to the spring constant calculated by spring constant calculating section 3.

Figure 3:
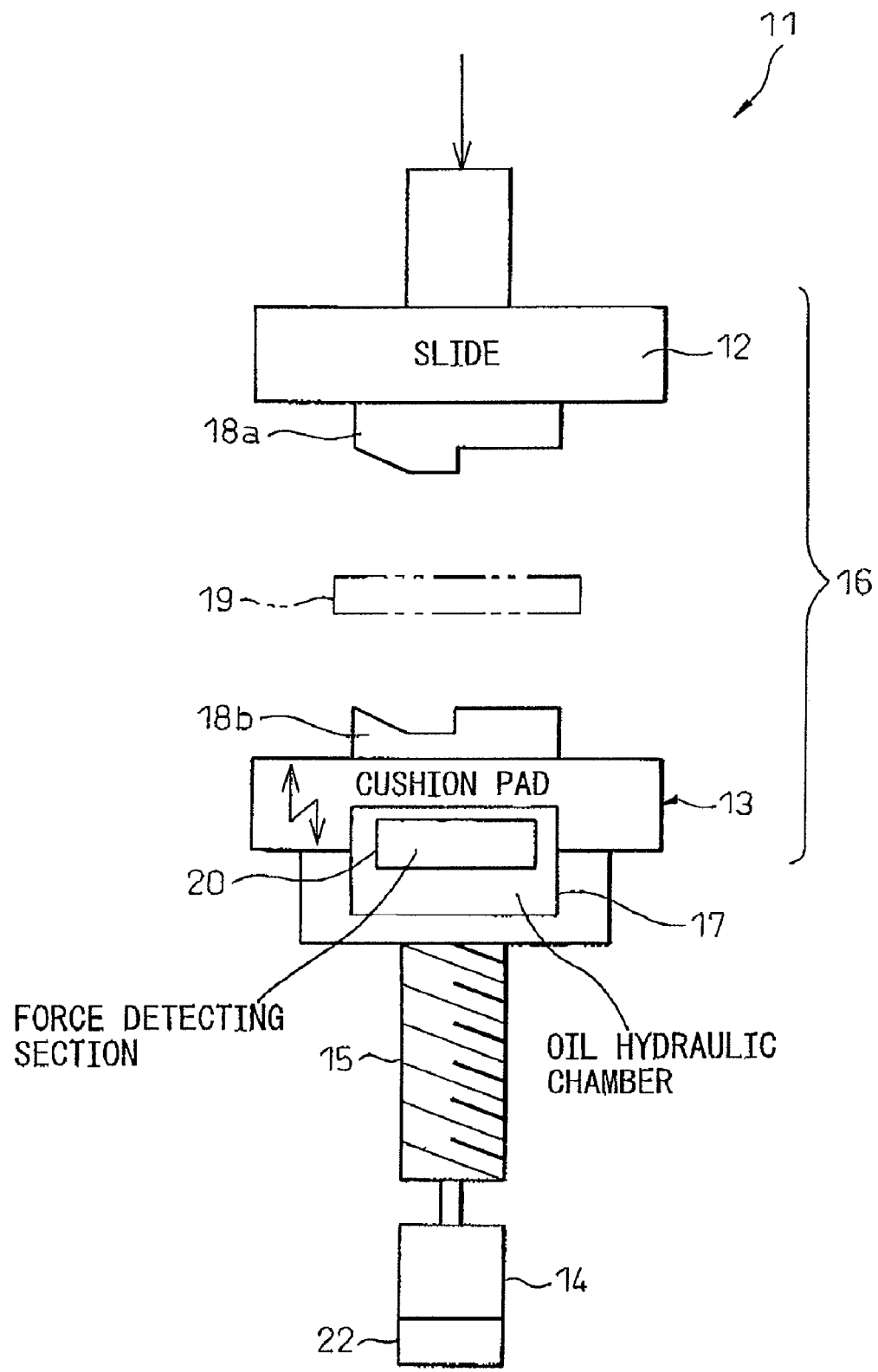
FIG. 3 is a schematic view of a slide of a press and a die cushion disposed in opposition to the slide.

As shown in FIG. 3, die cushion 13 includes a cushion pad and an oil hydraulic chamber 17 in the inside which has a liquid encapsulated at a specified pressure in order to relieve the impact of collision of slide 12 and die cushion 13. Oil hydraulic chamber 17 is adapted to be elastically compressed when slide 12 and die cushion 13 collide at a specified force. Between slide 12 and die cushion 13, there are upper and lower dies 18a, 18b opposed to each other and a metal member (not shown) called a bolster that supports the lower die 18b. Upper and lower dies 18a, 18b and the cushion pad are elastically deformed in accordance with the specified force at the time of collision of slide 12 and die cushion 13. Thus, in press functional structure portion 16 including slide 12 and die cushion 13, there is a certain proportionality relation that holds between the difference of displacements of slide 12 and die cushion 13 and the force detected between slide 12 and die cushion 13 when this difference of displacements arises. Therefore, in spring constant calculating section 3, a spring constant K of press functional structure section 16 can be obtained by dividing the force detected between slide 12 and die cushion 13 by the difference of displacements of slide 12 and die cushion 13. Thus, the spring constant K can be expressed as K=(force F/difference of displacements M).

Figure 4:
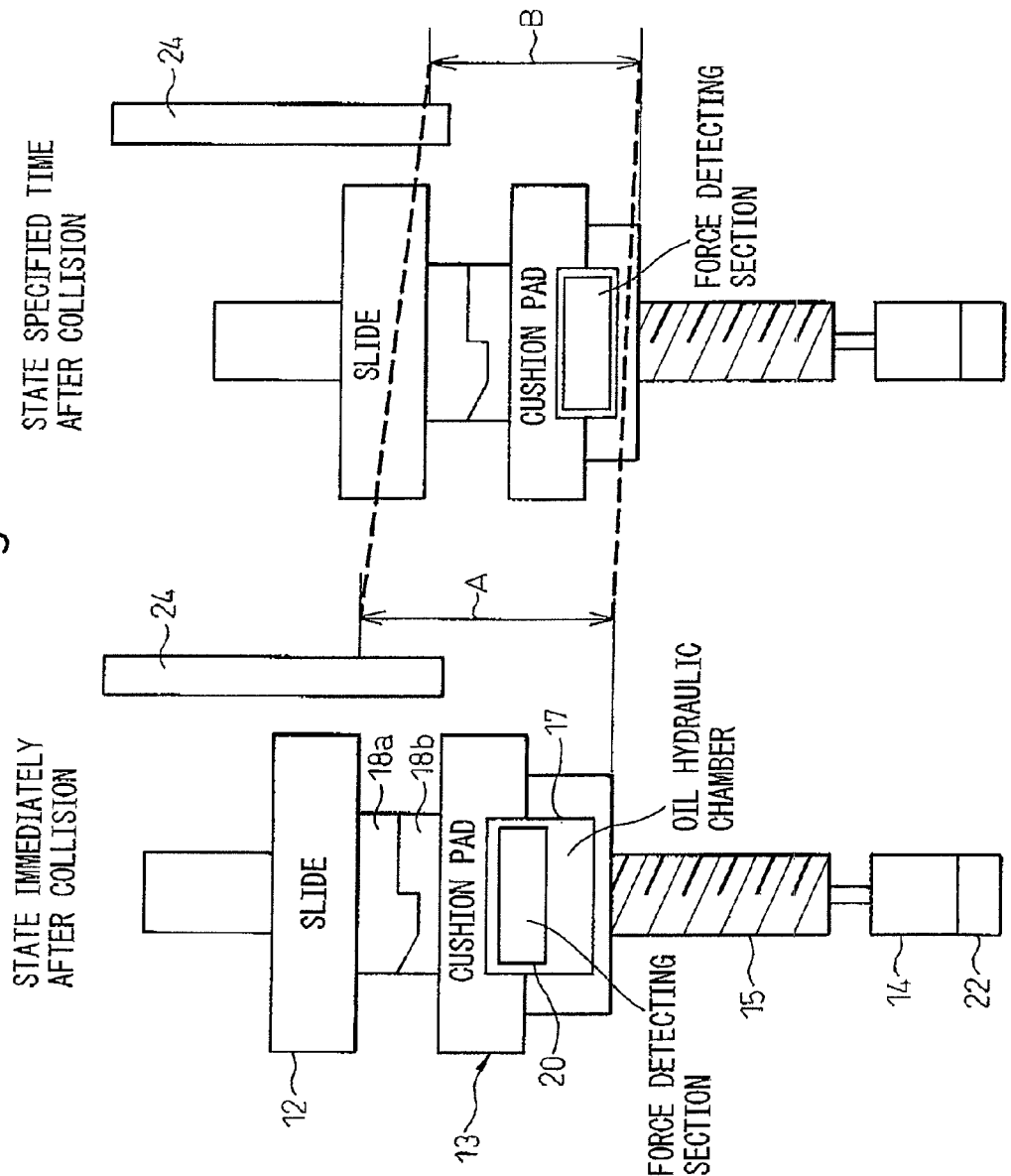
FIG. 4 is a view explaining comparison of the state of the slide and the die cushion immediately after collision with the state when a specified time has elapsed after the collision.

The difference between displacements of slide 12 and die cushion 13 can be obtained, for example, by a method as shown in FIG. 4. In this method, with no sheet-like pressed work piece (FIG. 3) interposed between slide 12 and die cushion 13, if A is the difference between the position of the lower surface of slide 12 and the position of the lower surface of die cushion 13, upon collision of upper and lower dies 18a, 18b between slide 12 and die cushion 13, and B is the difference between the position of the lower surface of slide 12 and the position of the lower surface of die cushion 13, after a specified period of time has elapsed after collision, then the difference between A and B can be taken as the displacement. The displacement of die cushion 13 is small relative to the displacement of slide 12. The difference of displacements can be obtained as a sum of the amount of compression of die cushion 13 itself and the elastic displacements of upper and lower dies 18a, 18b between slide 12 and die cushion 13.

In place of using a position detecting section 24 as a linear scale to detect the positions of slide 12 and die cushion 13, the difference of displacements can be obtained by integrating in time the difference of the moving velocity of slide 12 and the moving velocity of die cushion 13. In this case, the moving velocity of slide 12 is detected by a slide velocity detecting section 23 shown in FIG. 2, and the moving velocity of die cushion 13 can be calculated based on the value detected by a velocity detecting section 21 of servo motor 14.

The force that arises between slide 12 and die cushion 13 can be obtained in various ways, such as, for example, by using a force sensor provided on die cushion 13, or by using a torque value from a torque sensor provided on servo motor 14 to estimate a force exerted to an object, or using a current value of servo motor 14 to estimate the force, or the like. In the present embodiment, the force sensor provided on die cushion 13 is used as a force detecting section 20.

Next, the relationship of the force control gain to the spring constant is as follows. The force control gain is the ratio of the force error and the velocity command value. This can be expressed as (force error)×(force control gain)=velocity command value. This equation can be modified and rewritten as force control gain=(velocity command value/force error)= (proportionality constant C/spring constant K).

If the force error is e, and the spring constant of the elastic structure is K, then in order to obtain a force e that is deficient from the force command value, it is necessary to contract the elastic structure by L=e/K. The force error is thus replaced by a position error, and the task is reduced to setting an optimal gain in the position control loop. If the position control gain in the position control loop is P [1/sec], and the relationship of the position error L and the velocity command V is expressed as V=P×L, V means a velocity command for moving a distance L in time 1/P [sec] and the optimal P is a constant value that depends on the machine system. Substituting L=e/K, then V=(P/K)×e. The force gain set as a parameter becomes P/K, and thus, in order to obtain an optimal force gain, the force gain is changed in accordance with the value of K. In this way, a certain inverse proportionality exists between the spring constant and the force control gain. Therefore, in the force control gain changing section, the force control gain can be determined by multiplying the proportionality constant by the reciprocal of the spring constant K.

Figure 2:
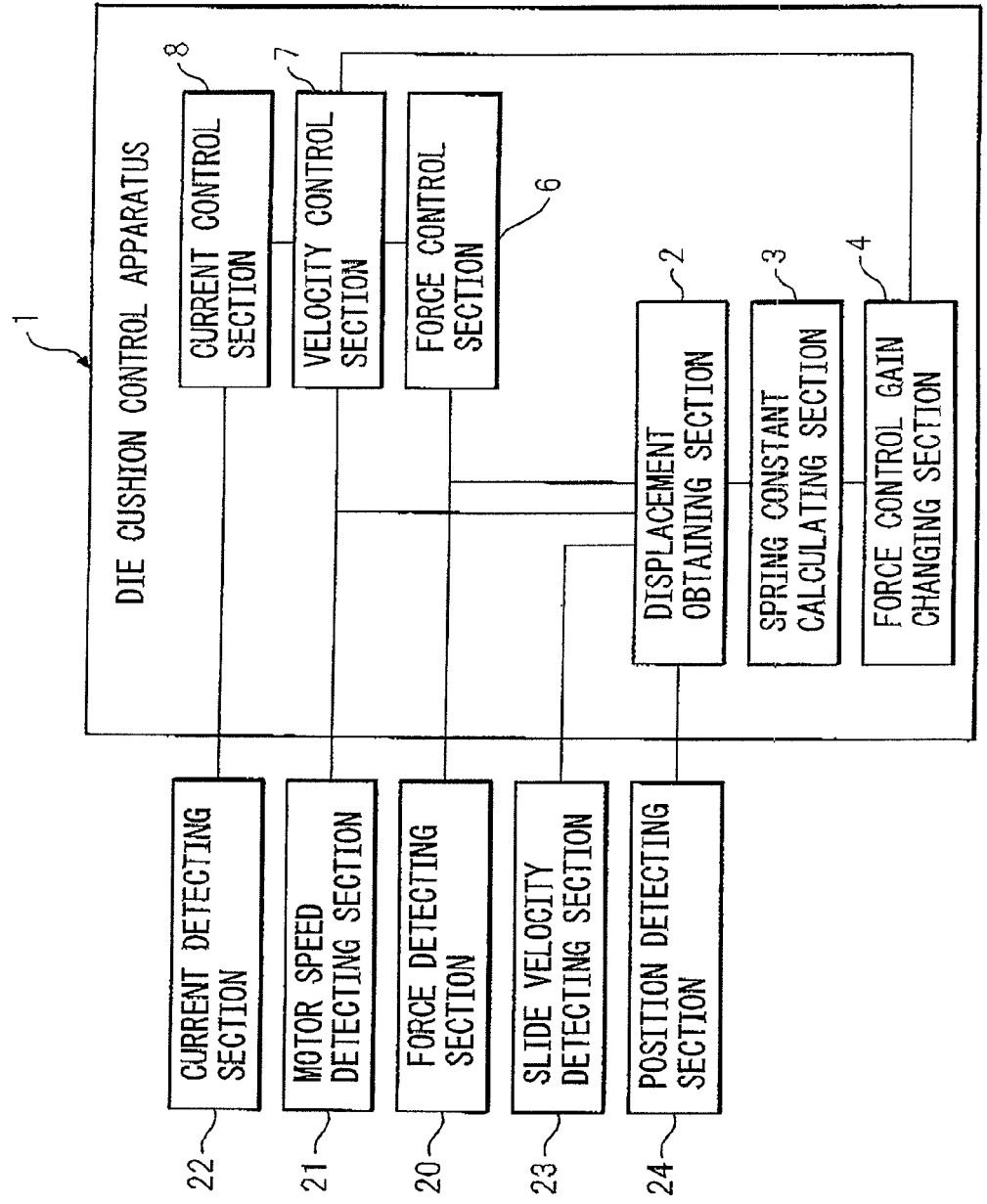
FIG. 2 is a view of the detailed construction of the die cushion control apparatus of FIG. 1.

Next, die cushion control apparatus 1 will be described in more detail with reference to FIG. 2. Die cushion control apparatus 1 comprises a higher controller (not shown) for processing control signal from external equipments and processing comprehensive control signal to servo motor 14, a force control section 6 as a force control circuit which performs feedback processing of the force command value set by the higher controller based on the actual force data detected by force detecting section 20 and outputs the velocity command value, a velocity control section 7 as a velocity control circuit which is situated on the downstream side of force control section 6 and outputs torque command value from the velocity command value, and a current control section 8 as a current control circuit which is situated on the downstream side of velocity control section 7 and converts the torque command value to current command value so as to control servo motor 14 via a servo amplifier (not shown). Force control section 6, velocity control section 7 and current control section 8 constitute a digital servo circuit.

As external equipment of die cushion control apparatus 1, there are the following: force detecting section 20, which feeds back the force data detected between slide 12 and die cushion 13 to force control section 6, motor velocity detecting section 21, which acts as an encoder to feed back the detected rotational velocity of servo motor 14 to velocity control section 7, a current detecting section 22, which feeds back the detected current of servo motor 14 to current control section 8, slide velocity detecting section 23, which provides the slide velocity to displacement obtaining section 2, and position detecting section 24, which acts as a linear scale to provide position data of slide 12 and die cushion 13 to displacement obtaining section 2.

The higher controller comprises CPU (Central Processing Unit). A memory consisting of ROM, a memory consisting of RAM, a non-volatile memory, an external teaching control panel provided with a liquid crystal display, various interfaces, and various memories are connected to the CPU via a bus. Various detecting sections 20-24 are electrically interconnected to the interfaces so as to transfer the detected data to respective control sections 6-8.

Figure 5:
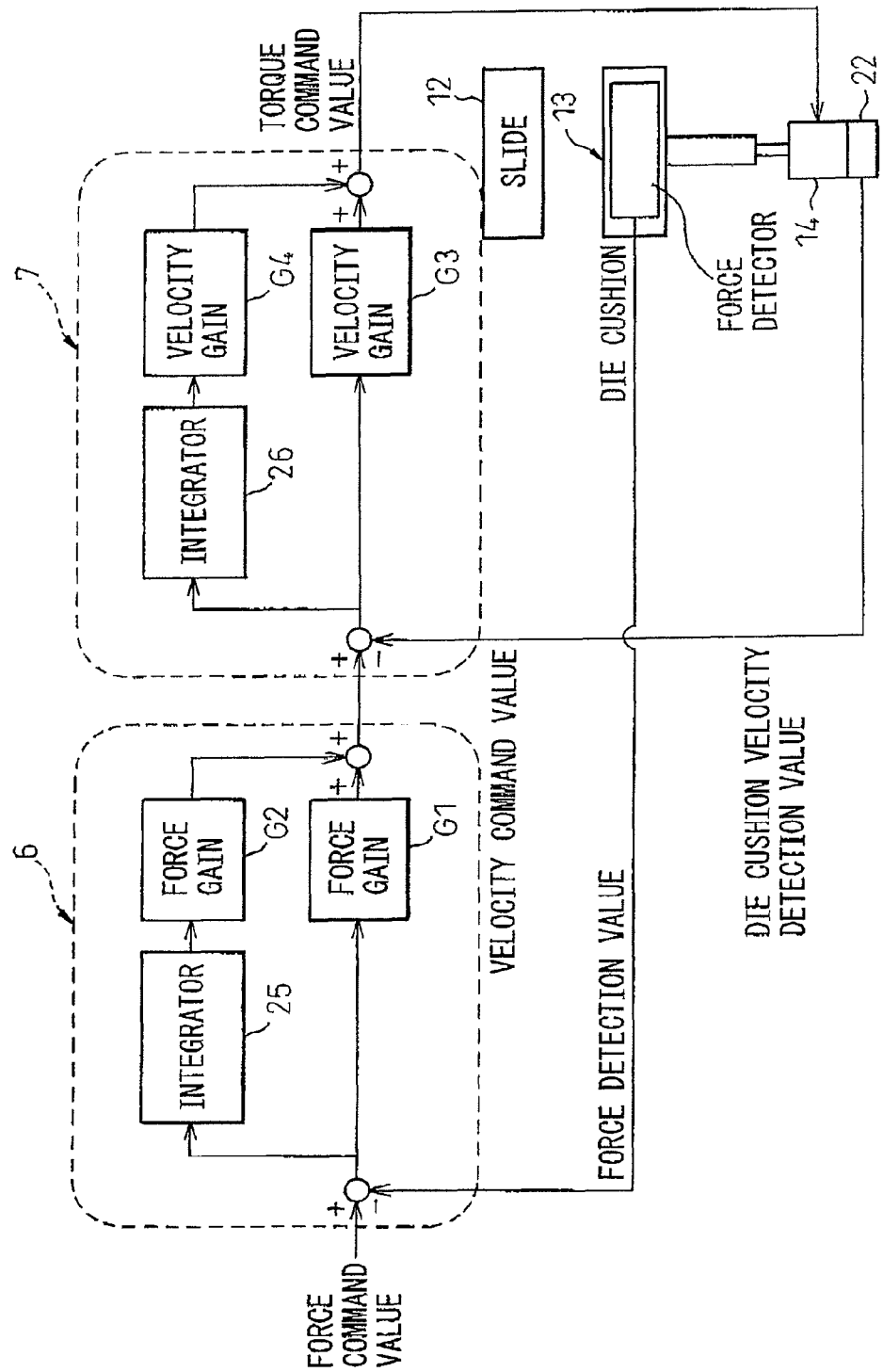
FIG. 5 is a block diagram of the flow of control in the die cushion control apparatus shown in FIG. 1.

As shown in FIG. 5, in force control section 6, the force error which is the difference between the force command value and the force detection value is multiplied by the force control gain to obtain velocity command value G1. In the case where integration operation using integrator 25 is performed in addition to the proportionality operation in force control section 6, the velocity command value can be obtained as (velocity command value)=(force error)×(force gain G1)+Σ(force error)×(force gain G2). Force gain G1 and force gain G2 can be obtained as the relation of specified magnification factor.

In velocity control section 7, the velocity error which is the difference between the velocity command value and the velocity detection value is multiplied by velocity control gain G3 to obtain the torque command value. Also in velocity control section 7, in the case where, in addition to the proportionality operation, an integration operation is performed using integrator 26, the torque command value can be obtained by (torque command value)=(velocity error)×(velocity gain G3)+Σ(force error)×(force gain G4).

Next, the force control gain changing method according to the present embodiment will be described with reference to FIGS. 6 to 9. In FIGS. 6 to 9, common processes are denoted by same step numbers.

Figure 6:
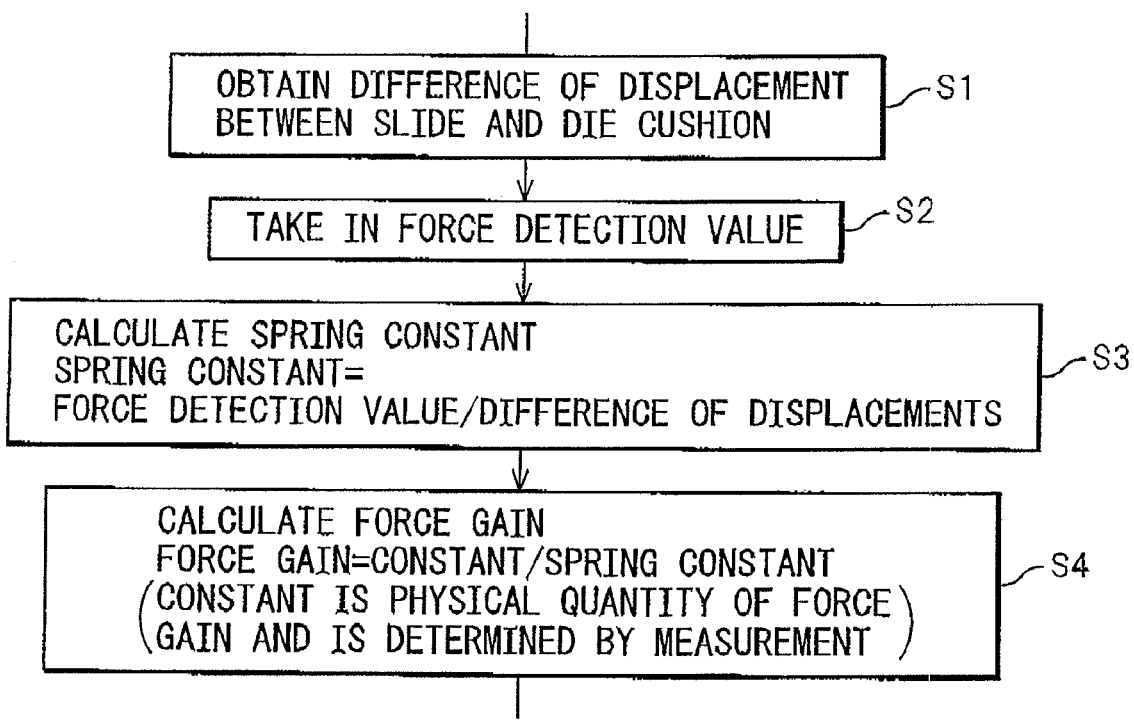
FIG. 6 is a view of a portion of basic flow chart useful for explaining a method for calculating the force control gain.

FIG. 6 is a view of the most basic portion of the force control gain changing method. At step 1, the difference of displacement between slide 12 and die cushion 13 is the difference between the position of the slide and the position of the die cushion as measured by position detecting section 24. Alternatively, it can be a time integral of the difference between the velocity of the slide and the velocity of the die cushion. At step S2, the force data is obtained from force detecting section 20 provided in die cushion 13. At step S3, the spring constant is determined as a value obtained by dividing the detected force data by the difference of the displacements between slide 12 and die cushion 13. At step S4, the force control gain is determined by dividing the proportionality constant as the optimal control state of the press functional structure portion by the spring constant obtained at step S3.

Figure 7:
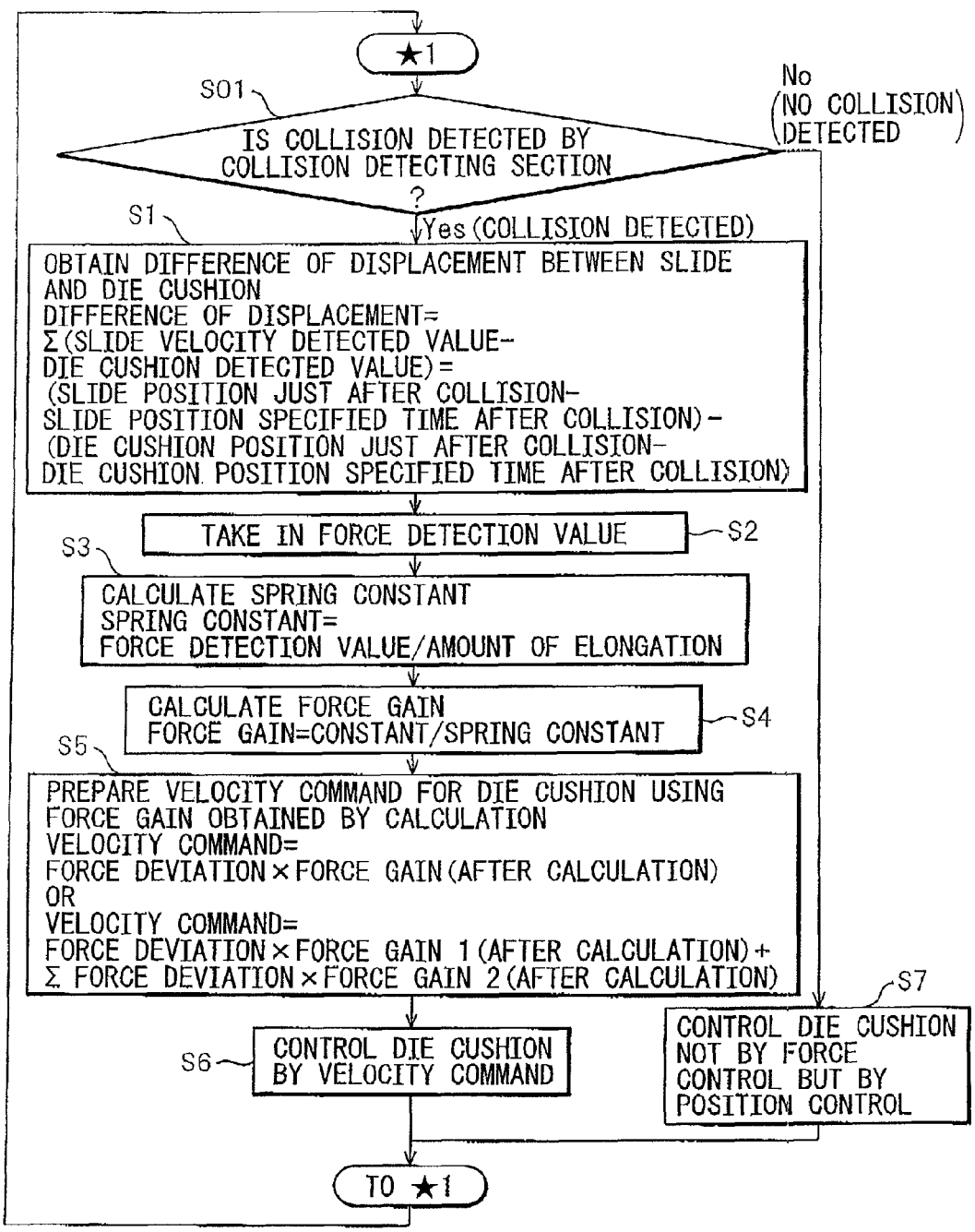
FIG. 7 is a view of a flow chart obtained by adding the step of determining the velocity command value to the flow chart of FIG. 6.

FIG. 7 is a view of a method with other steps added to the flow chart shown in FIG. 6, and shows the flow of control from the start of the gain change to the preparation of the velocity command. At step S01, it is determined by the collision detecting section that is not shown in FIG. 2 whether or not collision has occurred between slide 12 and die cushion 13. If the collision has occurred, the flow of control proceeds to step S1, and if the collision has not occurred, the flow of control proceeds to step S7 and position control is performed. By this position control, slide 12 and die cushion 13 are positioned arbitrarily at high speed. On the other hand, when the force control gain is changed at steps S1-S4, the velocity command value is prepared at step S5 based on the changed force control gain, and at step S6, servo motor 14 is controlled based on the prepared velocity command value.

Figure 8:
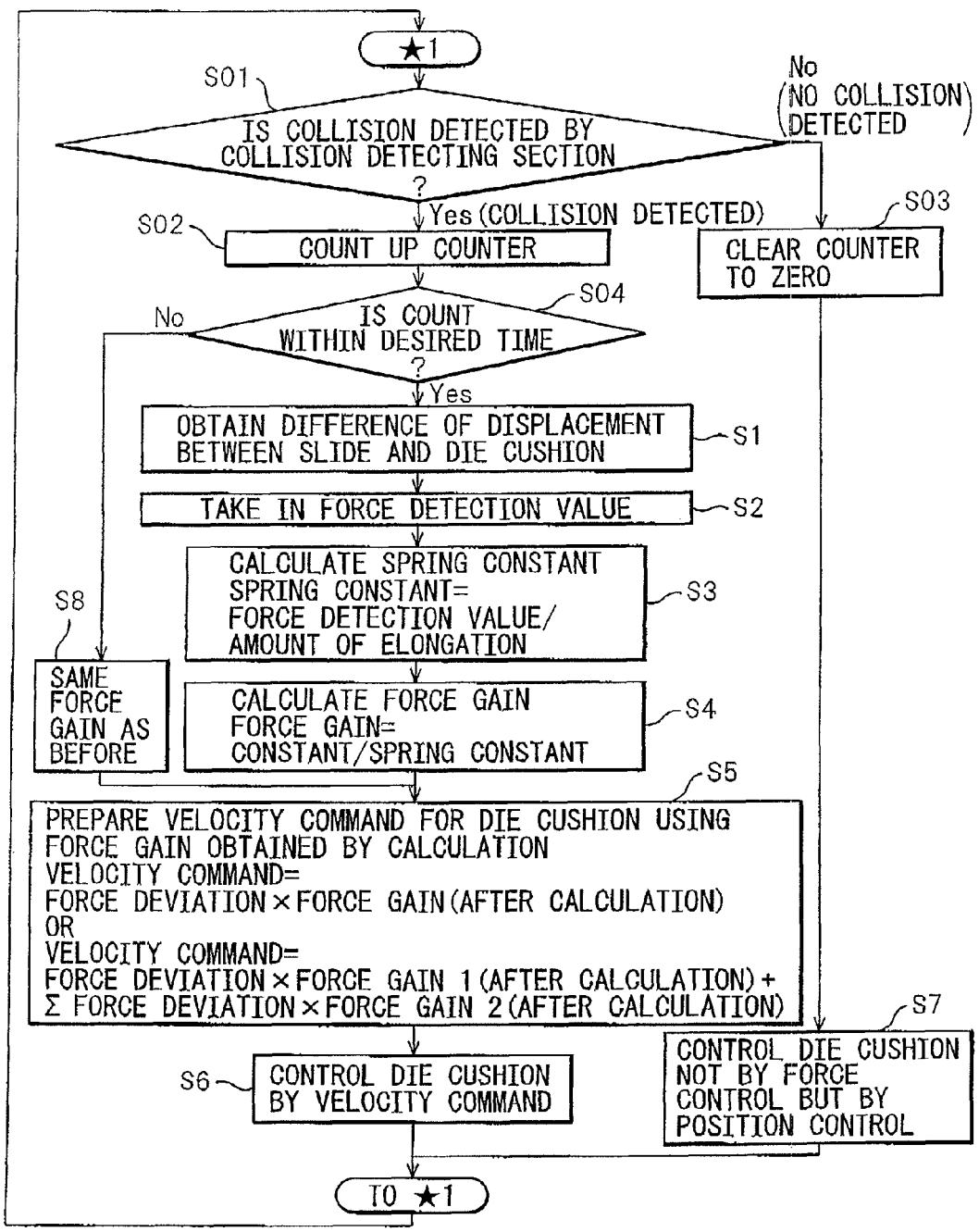
FIG. 8 is a view of a flow chart obtained by adding the step of counting the elapsed time after collision to the flow chart of FIG. 7.

In FIG. 8, another method is shown, in which the measuring elapsed time, and the like are added in order to be able to determine whether or not a specified time has elapsed after the collision of slide 12 and die cushion 13 occurred. At step S01, it is determined whether or not the collision of slide 12 and die cushion 13 has occurred. If the collision has occurred, at step S02, the elapsed time is counted in an accumulator. On the other hand, if it is determined at step S01 that the collision has not occurred, the accumulator is cleared to zero at step S03, and the flow of control proceeds to step S7. At step S04 following the step S02, it is determined whether or not the elapsed time counted in the accumulator is less than a specified time. If the elapsed time is less than the specified time, the flow of control proceeds to the steps S1-S4. If the elapsed time is not less than the specified time, the flow of control proceeds to step S8, where the force control gain is not changed and the same gain as before is used. Steps S1-S4, step S8, and steps S5 and S6 that follow are the same as in FIG. 7, and therefore, duplicate explanation is omitted.

Figure 9:
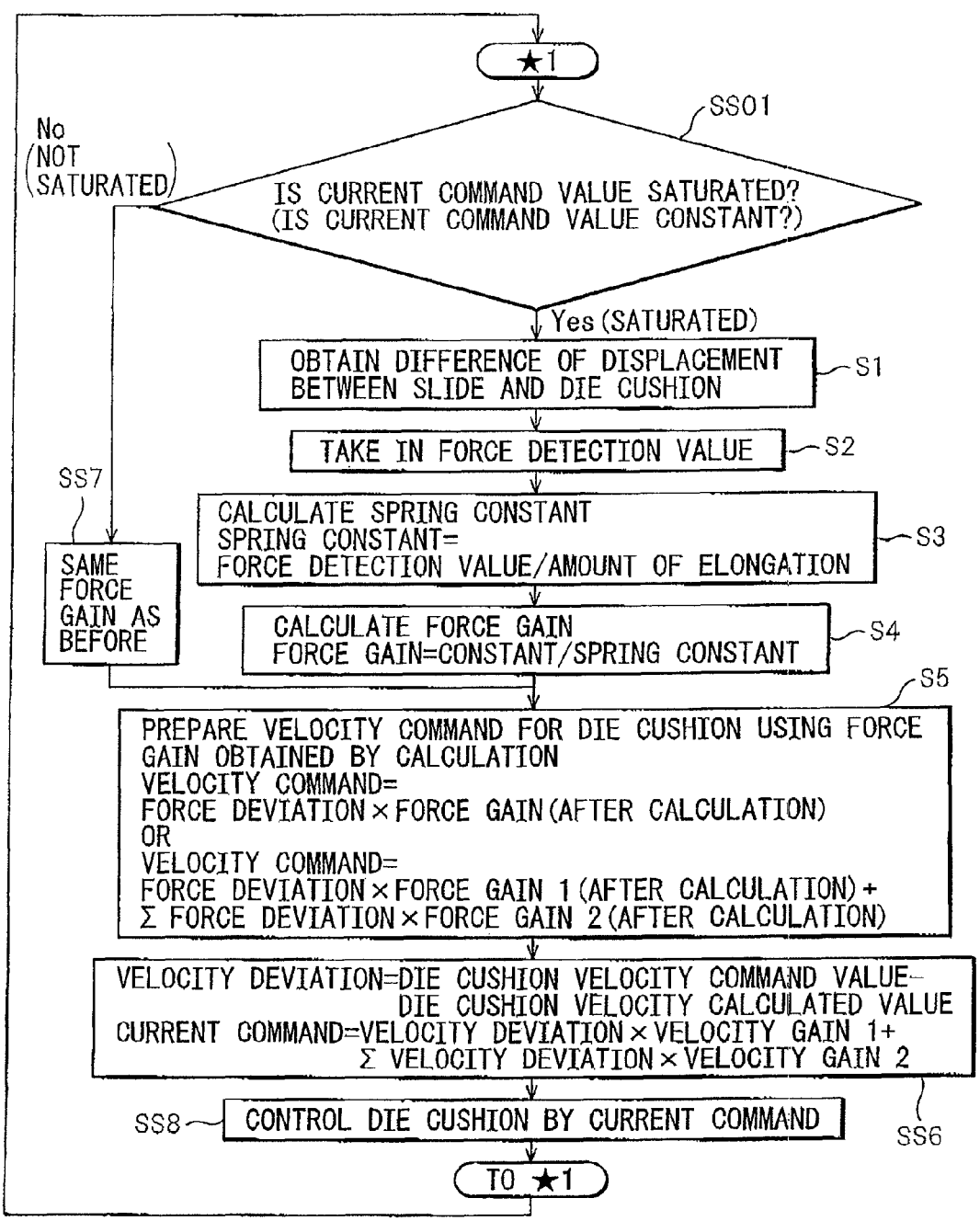
FIG. 9 is a view of a flow chart obtained by adding the steps of judging a current command value and determining the current command value.

FIG. 9 is a view showing another method in which a step is added in order to determine whether or not the current of servo motor 14 has been saturated (at a constant value). At step SS01, it is determined whether or not the current value has been saturated. If the current has been saturated, it is recognized to be in the state immediately after the collision of slide 12 and die cushion 13, and the flow of control proceeds to steps S1-S4. On the other hand, if the current has not been saturated, the flow of control proceeds to step SS7, and the same force control gain as before is used. At step S5, which follows steps S1-S4, or step SS7, the velocity command value is determined, and after, at step SS6, the current command value is determined based on the velocity error, at step SS8, servo motor 14 is controlled by the current command value. In this method, the state in which the current command value is saturated is the same as the state in which the current command value is a constant value, and means that die cushion 13 is displaced downward by full torque due to collision of slide 12 and die cushion 13. By changing the force control gain in this state, the force control gain can be determined easily and accurately.

Thus, in accordance with the present embodiment, the change of force control gain can be easily and accurately performed in response to variation of the machine characteristics or change of pressing conditions, and responsiveness of the force control and reliability of the force control can be thereby improved. Also, by using an optimal force control gain as required, the plastic flow of the pressed work piece can be increased, and occurrences of wrinkles or cracks in pressed work piece 19 can be prevented. A high quality pressing operation of a complicated three-dimensional shape, which has not been possible in the past, can also be carried out.

The present invention is by no means restricted to the above-described embodiment, but can be carried out in various modifications. Although, in the present embodiment, force detecting section 20 for detecting the force acting between slide 12 and die cushion 13 is provided in die cushion 13, it is also possible to provide force detecting section 20 in the slide, and to calculate the spring constant precisely and to determine the force control gain accurately.

The invention claimed is:

1. A method for changing a force control gain expressed as a ratio of a force error to a velocity command value in a control circuit performing a force control of a servo motor driving a die cushion disposed opposite to a slide in a press machine, said method comprising:

obtaining a difference between a displacement of said slide and a displacement of said die cushion in a state in which said slide and said die cushion collide with and are exerting a force on each other;

detecting said force when said difference between said displacement of said slide and said displacement of said die cushion is obtained;

calculating a spring constant of a structural portion including said slide and said die cushion based on a proportionality between said difference between said displacement of said slide and said displacement of said die cushion and said force, when the structural portion is regarded as an elastic structure; and changing said force control gain based on said spring constant using a proportionality between said force control gain and a reciprocal of said spring constant.

2. A die cushion control apparatus which controls a die cushion disposed in opposition to a slide in a press machine, said apparatus comprising:

a displacement obtaining section which is configured to obtain a difference between displacements of said slide and said die cushion in a state in which said slide and said die cushion collide with and are exerting a force to each other;

a spring constant calculating section which, when a structural portion including said slide and said die cushion is regarded as an elastic structure, is configured to calculate a spring constant of the structural portion based on a proportionality between said difference of the displacements and said force; and a force control gain changing section configured to change a force control gain based on said spring constant, using a proportionality between said force control gain expressed as a ratio of a force error and a velocity command value, and a reciprocal of said spring constant.

3. A die cushion control apparatus according to claim 2, wherein said force control gain changing section is configured to change said force control gain by multiplying a specified proportionality constant by the reciprocal of the calculated spring constant.

4. A die cushion control apparatus according to claim 3, wherein said displacement obtaining section is configured to obtain said difference of said displacements by integrating a difference between a velocity of displacement of said die cushion, determined from rotational speed of a servo motor driving said die cushion, and a velocity of displacement of said slide.

5. A die cushion control apparatus according to claim 3, wherein said force control gain is configured to be changed based on said spring constant within a specified time period after a collision of said slide and said die cushion.

6. A die cushion control apparatus according to claim 3, wherein said force control gain is changed within a specified time period in which a current command value to a servo motor driving said die cushion is constant.

* * * * *